United States Patent
Riihimäki

(10) Patent No.: US 8,736,090 B2
(45) Date of Patent: May 27, 2014

(54) PROTECTION ARRANGEMENT OF AN ELECTRIC POWER SYSTEM

(75) Inventor: Vesa Riihimäki, Vaasa (FI)

(73) Assignee: Wartsila Finland Oy, Vaasa (FI)

( * ) Notice: Subject to any disclaimer, the term of this patent is extended or adjusted under 35 U.S.C. 154(b) by 226 days.

(21) Appl. No.: 13/389,997

(22) PCT Filed: Aug. 6, 2010

(86) PCT No.: PCT/FI2010/050618
§ 371 (c)(1),
(2), (4) Date: Feb. 10, 2012

(87) PCT Pub. No.: WO2011/018549
PCT Pub. Date: Feb. 17, 2011

(65) Prior Publication Data
US 2012/0139264 A1   Jun. 7, 2012

(30) Foreign Application Priority Data
Aug. 12, 2009 (FI) ...................................... 20095838

(51) Int. Cl.
*F02D 9/04* (2006.01)

(52) U.S. Cl.
USPC .......................................................... 290/40 R

(58) Field of Classification Search
USPC ................. 290/40 R, 40 B, 40 C, 52
See application file for complete search history.

(56) References Cited

U.S. PATENT DOCUMENTS

| | | | |
|---|---|---|---|
| 3,836,822 A | 9/1974 | Schonfeld et al. | |
| 4,071,870 A | 1/1978 | Bloch et al. | |
| 4,344,027 A | 8/1982 | Karlicek et al. | |
| 5,239,253 A | 8/1993 | Shimizu et al. | |
| 5,390,068 A | 2/1995 | Schultz et al. | |
| 5,701,070 A | 12/1997 | Schultz et al. | |
| 6,864,595 B2 * | 3/2005 | Wall .............................. | 290/52 |
| 2004/0155466 A1 | 8/2004 | Sodermann et al. | |
| 2008/0043383 A1 | 2/2008 | Shah et al. | |

OTHER PUBLICATIONS

B. Delfino et al., "Impact of turbine fast-valving on generator and transformer protective relays", IEEE/NTUA Athens Power Tech Conference: "Planning, Operation and Control of Today's Electric Power Systems", Athens, Greece, Sep. 5-8, 1993 pp. 727-731.
R. L. Cresap et al., "Transient Stability Enhancement by 120-Degree Phase Rotation" IEEE Transactions on Power Apparatus and Systems, vol. PAS-100, No. 2, Feb. 1981, pp. 745-753.

* cited by examiner

*Primary Examiner* — Tho D Ta
(74) *Attorney, Agent, or Firm* — Muncy, Geissler, Olds & Lowe, P.C.

(57) ABSTRACT

The inventive protection arrangement of an electric power system comprises a relay arrangement (12) for measuring current, voltage or both of an electric grid (15). The relay arrangement is adapted to detect over-current, under-voltage or both. The protection arrangement comprises also a speed/load controller (16) that is in connection with the relay arrangement (12). The speed/load controller is arranged to drive a prime mover (11) of a generator (10) set as a response for the said detection. The speed/load controller (16) is connectable with said prime mover (11). In more detail the controller (16) is arranged to drive power output of the prime mover (11) to a lower level when over-current, under-voltage or both is detected.

8 Claims, 2 Drawing Sheets

PROTECTION ARRANGEMENT OF AN ELECTRIC POWER SYSTEM

FIELD OF TECHNOLOGY

This invention relates to a protection arrangement of an electric power system. Especially, the invention relates to a protection arrangement that is intended to install for a generator or generators.

PRIOR ART

During faults in a power system (electric power system) it is essential to maintain the synchronism of a generator in order to be able to continue operation after the fault clearance. A significant fault is, for example, three-phase short circuit, which leads on to a system voltage collapse at the fault location, hence causing the synchronizing torque between the generating unit and the grid to reduce significantly.

Typically, during these faults the load angle between the generator and the grid begins to open because the large inertia of the grid maintains the grid speed (phase) constant. However, the individual generator locating close to the place of the fault will accelerate due to loss of load (even to almost zero load when the voltage disappears) while the driving power (torque) from the prime mover maintains almost constant level.

The load angle is the angle of a sinusoidal power curve at the generator terminal at which point mechanical power input and electrical power out of the generator are in balance. In other words, the generator operates at a certain power level and load angle, by which angle the generator rotor angle leads the grid angle. The prime mover is an engine that feeds mechanical power to the generator. The combination of the generator and the engine is often called as a generator set.

Re-synchronizing of the generator is possible if the fault clearance happens fast enough so that the energy which has been injected to the speed of rotation of the generator during the fault is less or equal than the energy which can be injected to the grid after the fault clearance. FIG. 1 illustrates this by using so called equal area criterion.

On normal condition of the grid the generator produces power $P_m$ as much as the grid can consume. Point 0 illustrates this condition in FIG. 1. The electric power output at the generator terminal follows a sinusoidal curve 5. At point 0 the angle of the sinusoidal curve is $\delta_0$ that is the load angle. Due to a large disturbance of the grid, such as a three-phase fault, the generator's terminal voltage drops. Therefore the power output of the generator that is possible to transfer to the grid at the load angle $\delta_0$ suddenly drops. A sinusoidal curve 6 illustrates this fault situation, and as can be seen the electric power output drops to point 1. The generator accelerates before the fault is cleared at point 2. Area $A_1$ illustrates the energy that accelerates the generator's speed. At point 2 the load angle is different than at point 1.

The fault clearance at point 2 causes again a change of power that can be transferred into the grid. So, the operation point changes from point 2 to point 3 back to the curve 5. Now, the electric power output to the grid is greater than the mechanical power running the generator, which causes the generator to be retarded. Since the rotor speed is greater than the synchronous speed at point 3, the load angle $\delta$ continues to increase until the kinetic energy absorbed during the acceleration (area $A_1$) is expended by transferring the energy into the grid at point 4. Area $A_2$ illustrates the expended energy.

The generator returns to a transient stable operation point as long as area $A_2$ is greater or equal than area $A_1$. The example of FIG. 1 illustrates also the maximum load angle $\delta_{max}$ at point 4 to keep the system in the transient-stable state. A critical clearing angle $\delta_{cr}$ at point 2 is the limit of the load angle when the fault clearance is still possible. A critical fault clearing time depends on the prime mover torque, generator torque curve (and excitation level), starting load angle, and generator inertia constant H. It can be noticed that the greater the critical clearing angle is the greater the critical clearing time is. In FIG. 1 the maximum load angle is at point 4, and the critical clearing time is at point 2, but it should be noticed that the fault clearing may happen before the critical clearing angle $\delta_{cr}$ or the critical clearing time, and the load angle at which the accelerating energy is expended may be smaller than the maximum load angle $\delta_{max}$.

The generators may return to their normal states after small disturbances of the grid. Larger disturbances are handled by separating generators from the grid, if the disturbances do not cease in a short time, typically in 250 ms. Protection relays and switches are used for the separation. After fault clearances the generators are connected back to the grid whereby the generators must be run back to the synchronous speed. The time interval between the separation and reconnection is relatively long, which means harmful or serious breaks on power transmission and distribution.

SHORT DESCRIPTION OF INVENTION

The objective of the invention is to alleviate the drawbacks mentioned above. This is achieved by an arrangement and method described in the independent claims. Dependent claims describe different embodiments of the invention.

The inventive protection arrangement of an electric power system comprises a relay arrangement for measuring current, voltage or both of an electric grid. The relay arrangement is adapted to detect over-current, under-voltage or both. The protection arrangement comprises also a speed/load controller that is in connection with the relay arrangement. The speed/load controller is arranged to drive a prime mover of a generator set as a response for the said detection. The speed/load controller is connectable with said prime mover. In more detail the controller is arranged to drive power output of the prime mover to a lower level when over-current, under-voltage or both is detected.

DRAWINGS

Next the invention is described in more detail with the figures of the attached drawings in which drawings.

DESCRIPTION

The fault clearing should be made in a relatively short period, typically less than 250 ms, in order to maintain the synchronous speed of the generator near the fault point. In practice, the fault point of the grid is decoupled from the rest of the grid and immediately coupled back to the grid for restricting the effects of the fault. The greater the time period for the fault clearing is, the greater the reliability of the grid and the function of the generator are. Longer fault clearing times give more time for the disappearance of the fault.

Figure 1:
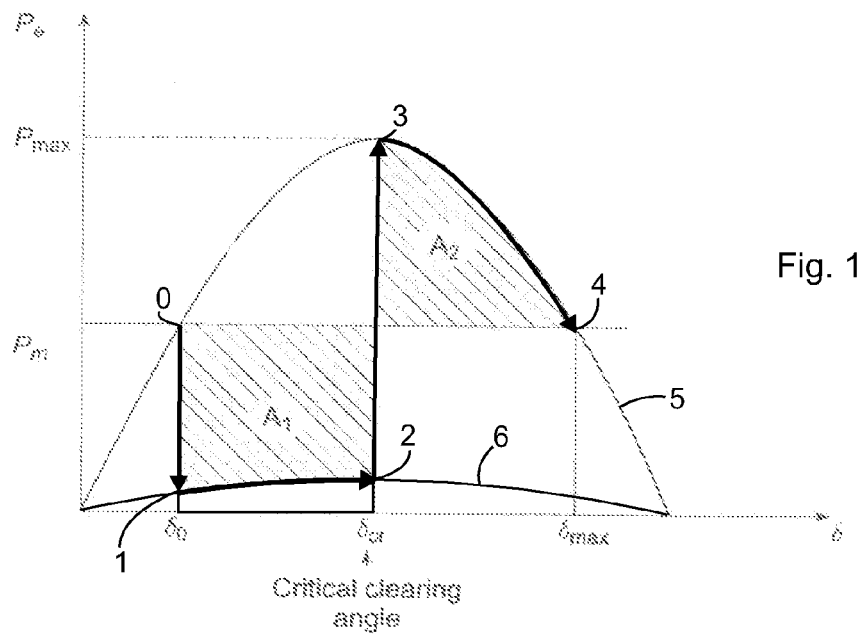
FIG. 1 illustrates an example of an equal area criterion.
Figure 2:
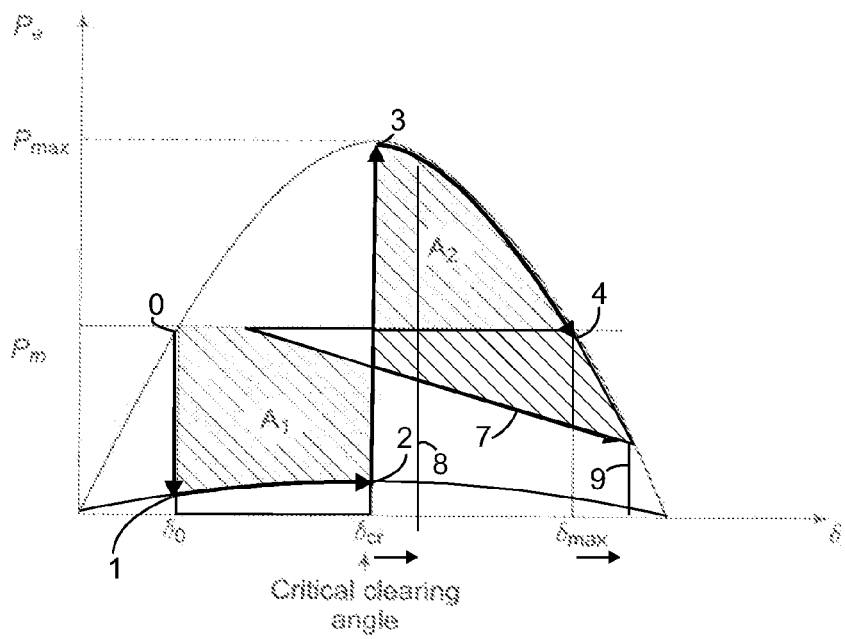
FIG. 2 illustrates an example of effects of the invention by using the equal area criterion.

A longer fault clearing time can be achieved by reducing the driving torque $P_m$ of the generator during the fault. FIG. 2 shows an example how this affects to the equal area criterion. Assuming that the fault and its disappearance are the same as in FIG. 1, the points 0, 1, 2, 3 and 4 are also the same. After the fault (and possible decoupling) (0→1) the driving torque is reducing following line 7. The accelerating energy (area $A_1$) is now smaller than in FIG. 1. The amount of energy (area $A_2$) that can be expended into the system is now greater than in FIG. 1. Therefore the critical clearing angle $\delta_{cr}$ moves to a greater angle 8, which means also a greater critical clearing time. The maximum load angle $\delta_{max}$ also moves to a greater angle 9.

Making it possible to reduce the driving torque fast enough, the prime mover of the generator set must be driven quickly after the detection of the fault. In general it is assumed that speed control cannot reduce the torque during the fault. This is because the event has a short duration. This is due to the fact that the speed control sees the increase of the speed after a relatively long delay, and additionally a droop control speed reference value increases as load disappears. The droop control is used for dividing the load of the grid between the parallel generators connected to the grid.

Figure 3:
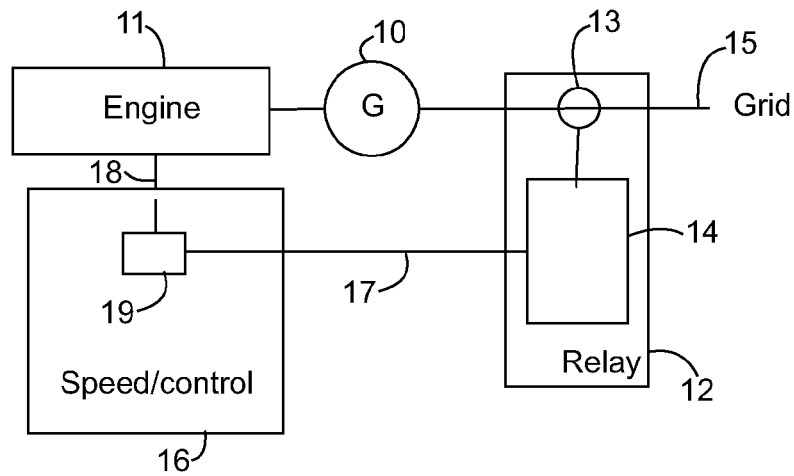
FIG. 3 illustrates an example of an inventive arrangement.

The invention makes it possible to reduce the driving torque very fast. The required control speed can be obtained if the speed/load controller of the prime mover is arranged to receive a special fault detection signal and to control the driving torque as a response to the detection signal. FIG. 3 shows an example of an inventive arrangement.

The arrangement comprises a relay arrangement 12 for measuring current, voltage or both of an electric grid 15. The relay arrangement, for example a protection relay, is adapted to detect over-current, under-voltage or both. A usual embodiment of a relay arrangement comprises an instrument transformer 13 for measuring electrical quantities from the grid. The instrument transformer is in connection with the actual relay 14. It is evident that the relay arrangement can be utilized in many ways.

The protection relay includes so called detection function which is based on a monitored signal. The detection occurs when the signal exceeds a certain predetermined limit. For example, the generator 10 output current exceeds the over-current limit. The detection signal, which is to be used in the invention, can be formed from single or multiple sources such as over-current, under-voltage or as a combination of over-current and under-voltage.

The relay arrangement 12 is connected to a speed/load controller 16. The detection signal 17 is transmitted to the engine speed/load controller. The speed/load controller 16 is arranged to drive a prime mover 11 of a generator set as a response to the detection. The speed/load controller is connectable with said prime mover. The controller 16 forms a driving signal 18 that is transmitted to the prime mover. In order to form the driving signal, the speed/load controller 16 comprises a fault detection unit 19 that is in connection with the communication line between the speed/load controller and the relay arrangement 12, and the communication line between the prime mover 11 and the speed load controller 16. The fault detection unit 19 makes it possible directly and quickly to form the driving signal in response to the detection signal. Since the fault detection unit 19 can be formed in many ways, it is described in dashed lines in FIG. 3. The fault detection unit 19 can be, for example, a software unit. It is worth to note that the speed/load controller 16 comprises also usual speed/load control means that belong to the prior art and are not relevant for describing the invention.

The communication between the relay arrangement 12 and the speed/load controller 16 can be arranged to be fast. For example, the digital output of the relay arrangement can be used, or an ultrafast line can be utilized. The time between the detection of over-current, under-voltage or both and the output of the detection signal 17 is less than 10 ms. The time for forming the driving signal 18 is also less than 10 ms in the speed/load controller 16. Therefore it can be achieved a time period less than 20 ms from the fault detection to the driving signal.

In more detail, the speed/load controller is arranged to drive power output of the prime mover to a lower level when over-current, under-voltage or both is detected. When the detection of over-current, under-voltage or both ceases the speed/load controller is arranged to drive power output of the prime mover to a higher level.

So, the prime mover 11 output is controlled towards zero or any other predetermined power level. The limitation of the power can be done electronically or mechanically. This control reduces the prime mover output very fast and, reduction of the power can be achieved even after tens of milliseconds. The prime mover can be of any technology that allows the power output to be controlled by a control signal. The required speed is achieved by using the relay arrangement for measuring current, voltage or both and transmitting the detection signal directly to the speed/load controller that is arranged to receive the detection signal and to form the driving signal for the prime mover as a response to the detection signal.

Figure 4:
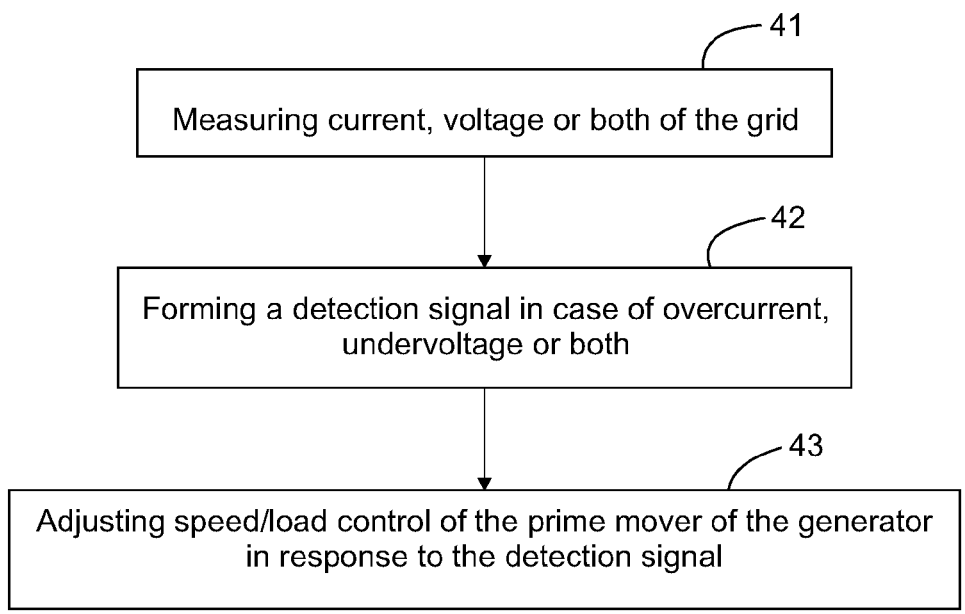
FIG. 4 illustrates an example of a flow diagram from the inventive method.

FIG. 4 illustrates the method for protecting an electric power system. Current, voltage of both are measured 41 from the grid. These quantities are used since faults affect them directly. As a response to the measurement a detection signal is formed 42 if over-current, under-voltage or both exist. In response to the existing detection signal the speed/load control of the prime mover of the generator is adjusted 43. The adjustment can be obtained by adapting the speed load controller to change a driving signal on the basis of the detection signal. The driving signal drives the prime mover. In more detail, the adjusting phase is arranged to drive power output of the prime mover to a lower level in response to the detection signal. After the fault disappears, the adjusting phase can be arranged to drive power output of the prime mover to any higher level desired when the detection signal of over-current, under-voltage or both ceases.

The described control affects the prime mover 11 torque radically based on the fault detection signal 17 which is taken from the generator protection relay arrangement 12 or similar device. The driving signal from the speed/load controller to the prime mover, can be formed in such a way that the delay between the detection of at least one exceeding of a limit of an electric quantity, and the driving signal to be formed is as long as desired, and the effect of the droop control is not taken into account. By reducing the prime mover torque the acceleration of the generator 10 is reduced. Further the critical clearing time and the maximum load angle increase during the fault, as well as the inventive control reduces the torque at post fault synchronizing. When the fault (detection signal) disappears, the effect of the detection signal can be removed immediately or after delay, or it can be set to any predetermined level.

In light of the examples above it is clear that an embodiment of the invention can be achieved in many ways. It is also clear that the invention is not restricted to the examples of this text, but the invention can be formed in any form within the limits of the claims.

The invention claimed is:

1. A protection arrangement of an electric power system, the electric system comprising a generator set, the protection arrangement comprising a relay arrangement for measuring current, voltage or both of an electric grid, which relay arrangement is adapted to detect over-current, under-voltage or both, the generator set being separable from a grid when over-current, under-voltage or both are detected, and the detected over-current, under-voltage, or both does not stop before a critical clearing time, the critical clearing time determining a period, during which resynchronization of the generator set with the grid is possible, wherein the protection arrangement comprises a speed/load controller that is in connection with the relay arrangement, which speed/load controller is arranged to drive a prime mover of the generator set as a response for said detection, said speed/load controller being connectable with said prime mover, the speed/load controller driving power output of the prime mover to a lower level when over-current, under voltage or both is detected, the driving of the power output to the lower level is arranged to initiate during a fault of the power system and before the critical clearing time of a generator of the generator set.

2. The arrangement according to claim 1, wherein the speed/load controller comprises a fault detection unit.

3. The arrangement according to claim 1, wherein the relay arrangement comprises an instrument transformer.

4. The arrangement according to claim 1, wherein the speed/load controller is in a direct connection with the relay arrangement.

5. The arrangement according to claim 1 wherein the driving of the power output to the lower level during the fault of the power system and before the critical clearing time of a generator of the generator set reduces the driving torque $P_m$ of the generator, moving the critical clearing time of the generator and providing a longer time for the fault clearing.

6. The arrangement according to claim 5 wherein the speed/load controller is arranged to drive power output of the prime mover to an higher level when the detection of over-current, under-voltage or both ceases.

7. A method for protecting an electric power system, the method comprising a phase for measuring at least one of current and voltage of an electric grid, the method further comprising phases for forming a detection signal in case of measurement of at least one of over-current and under-voltage, and adjusting speed/load control of a prime mover of a generator set in response to the detection signal,
wherein the adjusting phase is arranged to drive power output of the prime mover to a lower level in response to the detection signal, the driving of the power output to the lower level initiating during a fault of the power system and before the critical clearing time of a generator of the generator set.

8. The method according to claim 7, wherein the adjusting phase is arranged to drive power output of the prime mover to an higher level when the detection signal of at least one of over-current and under-voltage ceases.

* * * * *